S. HUTCHINSON.
Bee Hive.
No. 66,348. Patented July 2, 1867.
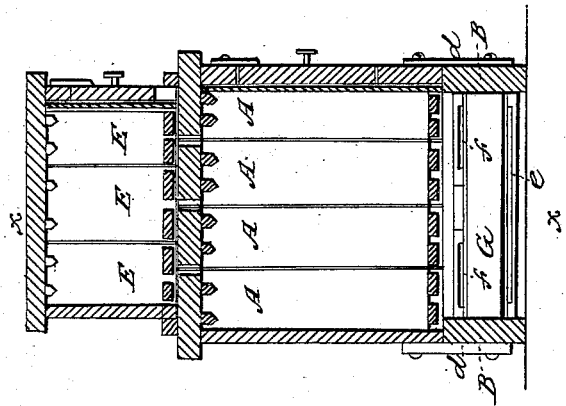
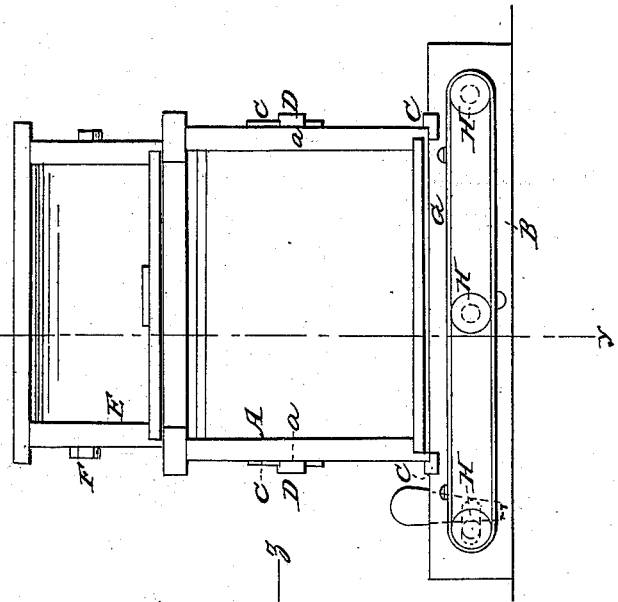
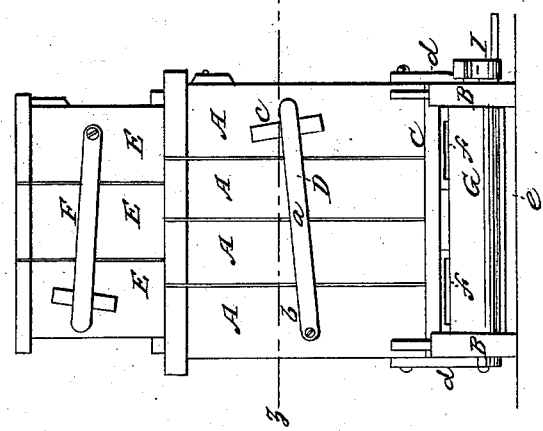 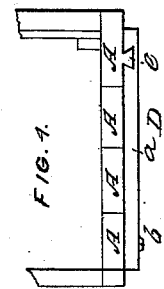
WITNESSES: INVENTOR:

United States Patent Office.

SAMUEL HUTCHINSON, OF NORTH LEWISBURG, OHIO.

Letters Patent No. 66,348, dated July 2, 1867.

---

IMPROVEMENT IN BEE-HIVES.

---

The Schedule referred to in these Letters Patent and making part of the same.

---

TO ALL WHOM IT MAY CONCERN:

Be it known that I, S. HUTCHINSON, of North Lewisburg, in the county of Champaign, and State of Ohio, have invented a new and improved Bee-Hive, and that the following description, taken in connection with the accompanying drawings hereinafter referred to, forms a full and exact specification of the same, wherein I have set forth the nature and principles of my said improvements by which my invention may be distinguished from all others of a similar class, together with such parts as I claim and desire to have secured to me by Letters Patent.

This invention relates to a new and improved bee-hive of that class which are constructed in sections. The invention consists in a novel and improved manner of clamping the sections together, whereby close joints are obtained, closer or tighter than usual, so that no crevices are allowed in which moth eggs may be deposited. The invention also consists in providing the hive with a bottom composed of an endless apron having moth-traps and cleats attached and arranged, as hereinafter fully shown and described, whereby the hive may be kept in a perfectly clean state and the propagation of moth within the hive avoided. In the accompanying sheet of drawings—

Figure 1 is an end view of my invention.

Figure 2, a side sectional view of the same taken in the line $x\ x$, fig. 3.

Figure 3, a transverse vertical section of the same taken in the line $y\ y$, fig. 2.

Figure 4, a horizontal section of a portion of the same taken in the line $z\ z$, fig. 1.

Similar letters of reference indicate like parts.

The body or main chamber of the hive is composed of three sections, A A A, which rest upon two parallel side pieces B B, connected at a suitable distance apart by transverse strips C C. These sections are secured together in close contact by clamps D D at two opposite ends, said clamps being composed each of a bar, $a$, pivoted at one end to one of the said sections, as shown at $b$, and notched at the opposite end to fit and work over an inclined bar, $c$, on the opposite end section, as shown clearly in figs. 1 and 4. These clamps are at about the centres of the sections, and it will be seen that by their means the sections may be closely brought together and secured in position. The bottoms of the sections, as well as their tops, are slotted in order to afford passages for the bees to pass through, (see fig. 3,) and upon the body or main chamber there is placed a supplementary chamber or spare-honey box, also composed of sections E, connected together by clamps F, arranged in the same way as the clamps of the sections composing the main chamber, (see fig. 1.) The main chamber of the hive is secured to the side pieces B B by means of brackets $d\ d$, shown in figs. 1 and 3, and between the side pieces B B there is placed an endless apron, G, which works over suitable rollers H. This endless apron extends along underneath the whole length of the hive, its upper surface being but a short distance below the slotted bottom of the main portion. To the endless apron there are attached transversely cleats $e\ f$, the cleats $e$ extending entirely across the apron and hollowed out at their under sides to form spaces for the reception of the moth eggs. The other cleats $f$ extend partially across the apron and are designed to contract the bee entrances to the same, as will be seen by referring to fig. 3, while the cleats $e$, besides serving as moth-traps, may be made to completely close the entrances to the main chamber of the hive. The endless apron G may be turned or adjusted by means of a crank, I, attached to one of the rollers H, and it will be seen that the bottom of the hive may be kept in a perfectly clean state by turning or adjusting the apron occasionally, and the worms or moth taken from the traps, the capacity of the bee entrances regulated as desired, or the entrances closed entirely.

I do not claim broadly a sectional hive, for they are old and well known; but I do claim as new, and desire to secure by Letters Patent—

The endless apron G, provided with cleats $e\ f$, and placed underneath the body or main portion of the hive, substantially as and for the purpose herein set forth.

SAMUEL HUTCHINSON.

Witnesses:
J. FRANK GOWEY,
J. A. MILEER.